United States Patent [19]

Spahr

[11] 4,449,918
[45] May 22, 1984

[54] APPARATUS FOR REGULATING FURNACE COMBUSTION

[75] Inventor: Richard F. Spahr, Ambler, Pa.

[73] Assignee: Selas Corporation of America, Dresher, Pa.

[21] Appl. No.: 280,994

[22] Filed: Jul. 6, 1981

[51] Int. Cl.³ .............................................. F23N 5/00
[52] U.S. Cl. .................................... 431/76; 236/15 E
[58] Field of Search ...................... 431/12, 76; 432/37; 110/188; 236/15 E

[56] References Cited

U.S. PATENT DOCUMENTS

| | | | |
|---|---|---|---|
| 3,015,357 | 1/1962 | Bain et al. | 431/76 |
| 3,074,644 | 1/1963 | Geniesse | 431/76 |
| 3,602,487 | 8/1971 | Johnson | 431/76 |
| 3,947,217 | 3/1976 | Graat et al. | 431/76 X |
| 3,973,898 | 8/1976 | Seider | 431/76 |
| 4,032,285 | 6/1977 | Rohr et al. | 431/76 X |
| 4,097,218 | 6/1978 | Womack | 431/76 |
| 4,118,172 | 10/1978 | Noir et al. | 431/12 |
| 4,147,500 | 4/1979 | karlsoen | 431/76 X |
| 4,309,949 | 1/1982 | Rastogi | 431/76 X |
| 4,362,499 | 12/1982 | Nethery | 431/76 X |

FOREIGN PATENT DOCUMENTS

| | | | |
|---|---|---|---|
| EP30706 | 6/1981 | European Pat. Off. | 236/15 E |
| 2510718 | 9/1976 | Fed. Rep. of Germany | 236/15 E |
| 2036290 | 6/1980 | United Kingdom | 431/76 |

Primary Examiner—Samuel Scott
Assistant Examiner—Margaret A. Focarino
Attorney, Agent, or Firm—Austin R. Miller

[57] ABSTRACT

Methods and apparatus for regulating furnace combustion air flow are provided which measure a gaseous combustion product in furnace gas after combustion, generate a present signal responsive to the measurement and change flow rate of combustion air in response to the generated signal in a manner the same as flow rate was changed in response to a previously generated signal if the present signal relates to the previous signal in the manner the previous signal related to a signal ancestor thereto but change the flow rate of combustion air in response to the generated signal in a manner opposite the manner the flow rate was changed in response to the previously generated signal if the present signal relates to the previous signal in a manner opposite the manner the previous signal related to a signal immediately ancestor thereto.

2 Claims, 5 Drawing Figures

APPARATUS FOR REGULATING FURNACE COMBUSTION

BACKGROUND OF THE INVENTION

1. Field of the Invention

This invention relates to methods and apparatus for regulating combustion within furnaces to achieve more optimum furnace performance.

2. Description of the Prior Art

U.S. Pat. No. 3,602,487 relates to enriching blast furnace gas with natural gas to heat a blast furnace stove by utilizing stove dome temperature to control addition of natural gas during a firing cycle by comparing measured dome temperature against a time profile of desired dome temperature output by a function generator. The time profile of desired dome temperature defines a control set point. An error signal, defined by difference between the measured dome temperature and a desired temperature-time profile at any time, is provided to a natural gas flow control.

'487 also discloses monitoring stove dome temperature and adding air to blast furnace gas flowing through the stove to prevent stove dome temperature from exceeding a predetermined constant temperature.

U.S. Pat. No. 3,947,217 discloses producing inert gases and regulating combustion air drawn to the process where the regulating elements include a servo motor for positioning the elements fully open or closed where the servo motor is responsive to magnitude of signals succeeding each other and having intervals therebetween. Signal to a servo motor connected to the air flow regulator is provided in response to deviation of the measured value from a set point value and is proportional in magnitude to a difference in certain measured gas levels. Control signals are supplied only when upper or lower limits are exceeded, i.e. there is a deadband within which the control system does not operate.

Of lesser interest are U.S. Pat. Nos. 3,074,644; 3,224,838; 3,354,931; 3,503,553; 3,616,274; 3,861,855; 3,973,898; 4,032,285; 4,059,385 and 4,097,218.

One previous approach in attempting to achieve relatively optimum operation of fired furnaces has been to measure oxygen content of flue gas and to control air input to the burner in response thereto. This has not been entirely successful. The excess air at which the furnace burner operates at greatest efficiency must be known, however, the excess air-efficiency characteristic varies as furnace burn rate varies, so that air input to the burner cannot be maintained constant. Changes in fuel in the furnace also change the excess air-burner efficiency ratio. As an additional difficulty, air drawn into the furnace after combustion can provide an erroneous indication of burner efficiency because oxygen analyzers cannot differentiate between excess air provided to the furnace burner and air leaking into the furnace.

Another approach to maximizing burner performance in fired furnaces has been to optimize air flow based on level of carbon dioxide in the furnace flue gas. This approach has not been entirely successful. Leaks in the furnace cause air dilution of the flue gas with consequent reduction in the percentage of carbon dioxide. Moreover, fuel and firing load changes may alter the carbon dioxide percentage in the flue gas. Finally, even if a desired carbon dioxide content set point is provided, a controller comparing measured carbon dioxide against the set point value gives no indication as to whether air flow should be increased or decreased so as to make the measured carbon dioxide percentage more closely approach the set point percentage.

OBJECTS OF THE INVENTION

It is a principal object of this invention to provide a method for controlling flow of air into a combustion furnace in response to measured level of carbon dioxide in the furnace flue gas by dynamically changing the air flow input to the furnace without reference to a fixed set point indicative of a desired carbon dioxide level in the furnace flue gas.

SUMMARY OF THE INVENTION

This invention provides methods and apparatus for optimizing combustion in a fired furnace in response to a measured level of carbon dioxide in the furnace flue gas without reference to a desired set point indicative of carbon dioxide in the flue gas after combustion.

In one aspect of the invention, flow of combustion air to a furnace is regulated by measuring a gaseous combustion product in furnace gas after combustion. A present signal is generated responsive to the measured amount of combustion product. Flow rate of combustion air to the furnace is changed in response to the generated signal in the same manner as flow was changed in response to a previously generated signal if the present signal relates to the previous signal in the manner the previous signal relates to an immediately preceeding ancestor of the previous signal; flow rate of combustion air is changed in response to the generated signal in a manner opposite the manner flow was changed in response to the previously generated signal if the present signal relates to the previous signal in a manner opposite the manner the previous signal relates to the immediately preceeding ancestor thereto.

In another aspect of the invention there is provided apparatus for regulating flow of combustion air to a furnace comprising means for sensing a combustion product in furnace gas after combustion thereof and producing a signal indicative of the sensed combustion product. First means maintain the signal indicative of the combustion product at the time of sensing. Comparison means compare the maintained signal with a signal indicative of the level of the sensed combustion product at a subsequent time and provide results of the comparison to an actuator for opening and closing a damper regulating flow of combustion air through the furnace.

DESCRIPTION OF THE PREFERRED EMBODIMENTS

Figure 1:
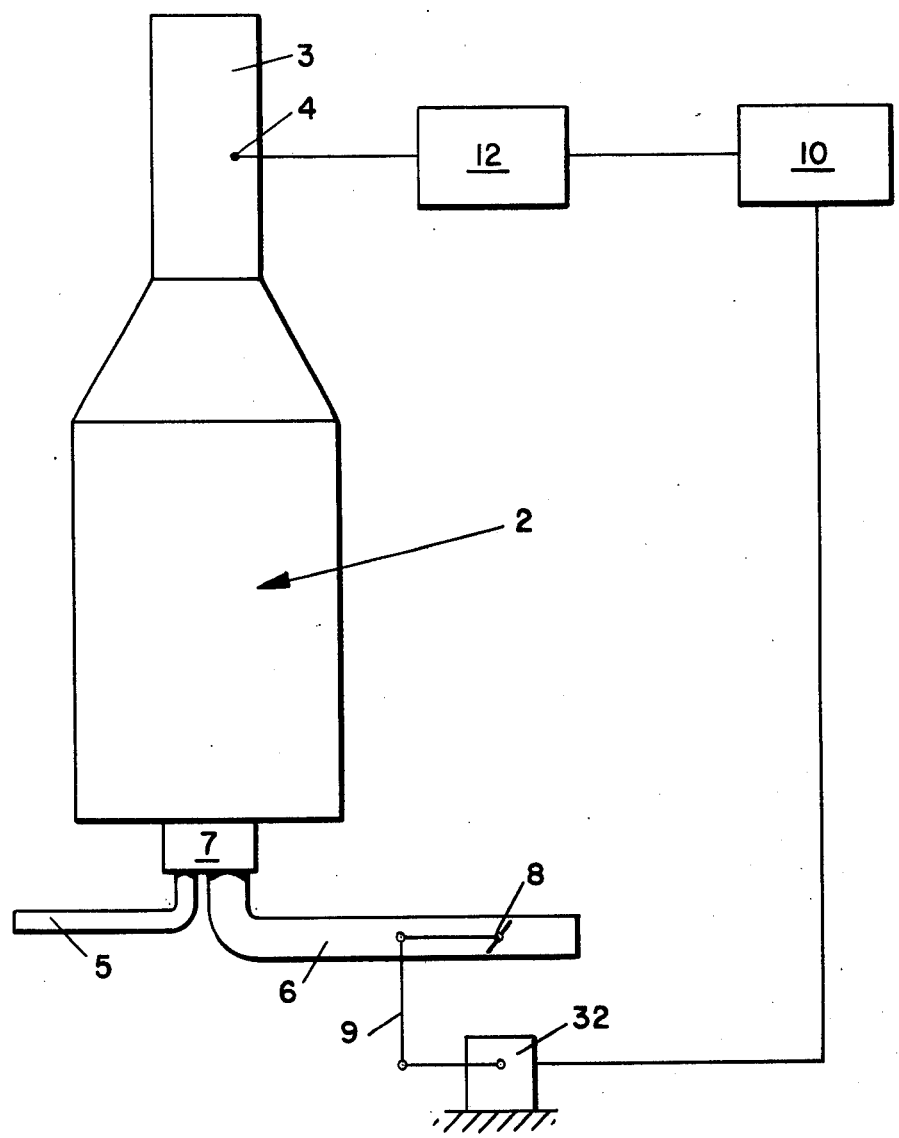
FIG. 1 schematically illustrates application of the invention to a furnace.

FIG. 1 schematically illustrates application of the invention to a furnace 2 having an exhaust stack 3 with gas sensing probe 4 resident therein providing a signal indicative of sensed level of carbon dioxide to gas analyzer 12 for measuring level of carbon dioxide in the furnace exhaust gas. Fuel is provided to the furnace via a fuel line 5 while combustion air is provided via combustion air line 6. Lines 5, 6 communicate with a burner 7 residing in the wall of furnace 2. Burner 7 mixes fuel and air and introduces the fuel-air mixture to the furnace interior for combustion therein. An air trim valve 8 is within line 6 and regulates flow of combustion air to burner 7 in response to rotation of an output shaft of motor 32 connected to valve 8 via a linkage 9. A block 10 generally indicates logic circuitry manifesting aspects of the invention, serving to regulate flow of combustion air through line 6 by controlling operation of motor 32 in response to signals received from gas analyer 12. Lines via which respective signals are provided from sensor 4 to analyzer 12, from analyzer 12 to circuitry 10 and from circuitry 10 to motor 32 have not been numbered.

For given operating conditions, modulation of combustion air by valve 8, from less-than to in-excess-of the amount of combustion air required by burner 7 produces an ascending and descending curve of carbon dioxide sensed by sensor 4. A relative maxima at juncture of ascending and descending portions of the characteristic curve of carbon dioxide versus time defines maximum efficiency of burner 7 for the given operating conditions.

An ideal burner would produce a measured maximum of carbon dioxide at stoichiometric conditions, i.e. at the theoretically calculated fuel-air mixture, with no excess air being required. Unfortunately, in commercial burners fuel-air mixing is not perfect and, accordingly, introduction of excess air is required to insure that combustion goes to completion. Recognizing that combustion is a dynamic process and that the relative maximum, on the characteristic curve of carbon dioxide versus time, may move, circuitry 10 regulates combustion air by actuating valve 8 to continuously approach the relative maximum, on the characteristic curve of carbon dioxide sensed as a function of time, indicative of optimum performance of burner 7.

Figure 2:
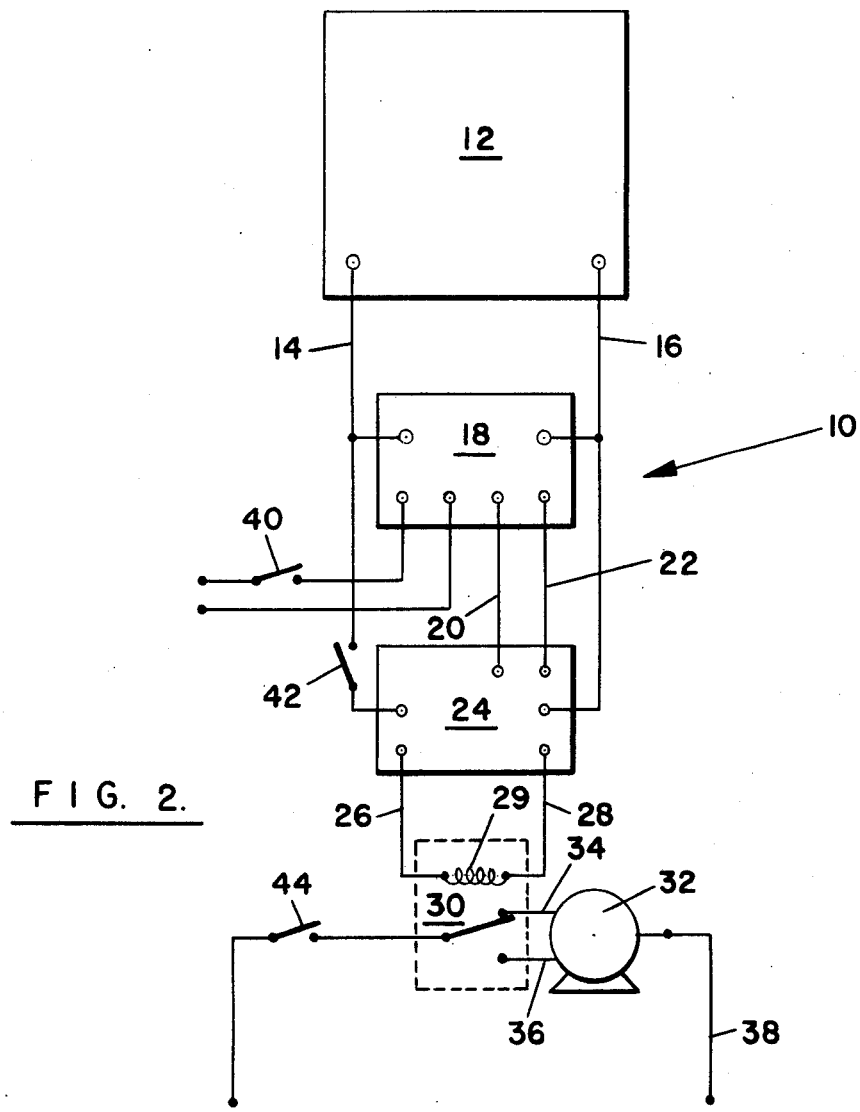
FIG. 2 is a schematic representation of apparatus embodying aspects of the invention.

Referring to FIG. 2, the circuitry apparatus for regulating flow of combustion air to furnace, to maintain a relatively optimum fuel-air mixture for high combustion efficiency, in response to measured level of carbon dioxide in furnace gas after combustion is designated generally 10. Gas analyzer 12 continuously senses relative level of carbon dioxide in the furnace gas after combustion, by processing a signal received from sensor 4, and continuously produces an electrical signal indicative of the sensed level of carbon dioxide, providing this signal at output lines 14, 16. A sample-and-hold module is designated generally 18 and receives the electrical signal output via lines 14, 16 from gas analyzer 12. Module 18 produces a continuous electrical signal corresponding to the electrical signal produced by analyzer 12 at a preselected time defined by closure of switch contacts 40 actuating module 18. Specifically, when a signal is provided by analyzer 12 as input to module 18 and module 18 is actuated, output of module 18 is a continuous signal corresponding to the signal produced by analyzer 12 at the preselected time. Module 18 provides its continuous signal output via lines 20, 22 to a voltage comparator 24.

Comparator 24 receives the electrical signal indicative of the level of carbon dioxide from analyzer 12 via lines 14, 16 whenever switch contacts 42 close, actuating comparator 24. When actuated, comparator 24 compares the magnitude of the signal received via lines 20, 22 from module 18. Comparator 24 provides an output signal via lines 26, 28 only if the signal input thereto by lines 14, 16 is of less magnitude than the signal input thereto by lines 20, 22.

Signal output by comparator 24 is provided via lines 26, 28 as input to a reversing impulse relay 30. Electric motor 32 has an output shaft rotatable in respective directions according to which of motor input terminals 34, 36 is energized by reversing impulse relay 30. Motor terminals 34, 36 connect with respective output terminals of relay 30. Power to the output terminals of reversing impulse relay 30 and hence to motor 32 via input terminals 34, 36 is provided by line 38.

A cycle timer, not shown, controls the opening and closing of the cycle timer switch contacts 40, 42 and 44 located respectively in the trigger input line to module 18, the input line to comparator 24 and line 38 connected as input to reversing impulse relay 30.

During operation, gas analyzer 12 continually samples the carbon dioxide product of combustion in the exhaust gas from furnace 2 and provides a signal indicative of the carbon dioxide level in the furnace combustion gas to module 18. When the cycle timer closes contact 40, this triggers module 18, freezing the signal output by analyzer 12 representing measured percentage of carbon dioxide in the furnace combustion gas; module 18 thereupon provides a continuous signal, of that magnitude, to comparator 24 via lines 20, 22. The signal provided via lines 20, 22 is provided continuously until module 18 is triggered again, at a later time. Even though contact 40 may reopen shortly after closing, module 18 produces the constant output signal, indicative of the signal output by analyzer 12 at the time contact 40 closed, until contact 40 closes again, at subsequent time.

Comparator 24 is actuated by closure of contact 42. Output, if any, from comparator 24 is provided only while contact 42 is closed.

Relay 30 operates motor 32 only upon closure of contact 44. Whenever an input coil 29 of relay 30 is energized by a signal received via lines 26, 28, the output switch of relay 30 reverses, breaking contact with terminal 34 or 36 and making contact with the remaining terminal of the pair 34, 36.

Figure 3:
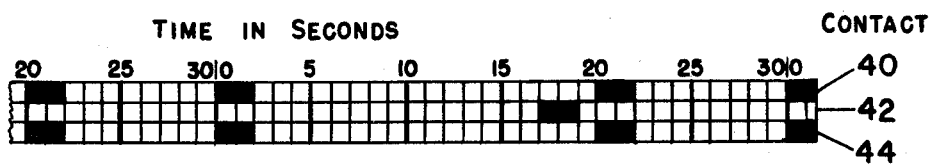
FIG. 3 is a bar chart illustrating the sequence of operation of apparatus depicted in FIG. 2.

FIG. 3 illustrates one sequence of operation of the apparatus of FIG. 2 as controlled by cycle timer contacts 40, 42, 44. The sequence illustrated works on a thirty second cycle.

From FIG. 3, the initial time which corresponds to time thirty seconds, contacts 40 and 44 close simultaneously for two seconds. This causes module 18 to freeze the signal output by analyzer 12 during the two second closure of contact 40 and to provide this frozen signal to comparator 24. Simultaneously, closure of contact 44 energizes motor 32 for the two second duration closure of contact 44. Operation of motor 32 serves either to open further or to close further damper valve 8, according to direction of rotation of the output shaft of motor 32 as controlled by which of contacts 34, 36 is already contacted by the output switch portion of relay 30.

Once the two second interval has elapsed, i.e. at time two seconds in FIG. 3, cycle timer contacts 40, 44 open. All three cycle timer contacts 40, 42, 44 remain open until time seventeen seconds whereupon contact 42 closes for two seconds. Closure of contact 42 actuates comparator 24, causing comparator 24 to compare the signal received from module 18 as a result of the previous closure of contact 40 at time zero seconds with the signal then being received by comparator 24 via lines 14, 16. Comparator 24 produces a signal input to the input coil 29 of relay 30 via lines 26, 28 only if the signal received via lines 14, 16 is less than the signal received via lines 20, 22. Any signal from comparator 24 via lines 26, 28 to relay 30 causes the output switch of relay 30 to move from one of contacts 34, 36 to the remaining contact.

At time nineteen seconds, all three contacts 40, 42, 44 are open.

At time twenty seconds, contacts 40, 44 close again, for an additional two second interval. This closure of contacts 40, 44 one second after actuation of comparator 24 assures that any repositioning of damper valve 8 required as a result of operation of comparator 24 is performed promptly.

Since comparator 24 provides an output signal reversing rotation of output shaft of motor 32 via action of relay 30 only when the presently sensed level of carbon dioxide is less than the immediately preceeding sensed level, so long as sensed level of carbon dioxide increases as damper valve 8 is being opened, motor 32 opens damper valve 8 even wider. Only after a maximum percentage carbon dioxide in the exhaust gas is reached and carbon dioxide sensed begins to decrease does comparator 24 produce an output signal reversing motor 32 whereupon motor 32 begins closing the furnace damper.

If sensed level of carbon dioxide then increases, comparator 24 does not produce an output signal and continued operation of motor 32, in response to closure of contact 44, continues to close damper valve 8. Only when damper valve 8 closes sufficiently that combustion efficiency is impaired, with carbon dioxide sensed in the exhaust gas decreasing as a result of incomplete combustion within the furnace, does comparator 24 produce an output signal, thereby again reversing direction of motor 32 whereupon motor 32 opens damper valve 8 further, allowing more air into the furnace, producing more complete combustion. Motor 32 continues to open damper valve 8, allowing even more air into the furnace until the air exceeds that required for complete combustion. Any amount of air in excess of the amount required for complete combustion causes sensed carbon dioxide to decrease, resulting in comparator 24 again producing an output signal causing motor 32 to reverse thereby causing damper valve 8 to close somewhat. Consequently the system is self-regulating and continuously seeks optimum combustion by moving damper valve 8 to maintain a maximum sensed level of carbon dioxide in the furnace combustion gas.

The thirty second cycle sequence illustrated in FIG. 3 may be shortened or lengthened, as dictated by the time constants of the various component parts depicted in FIGS. 1 and 2.

Figure 4:
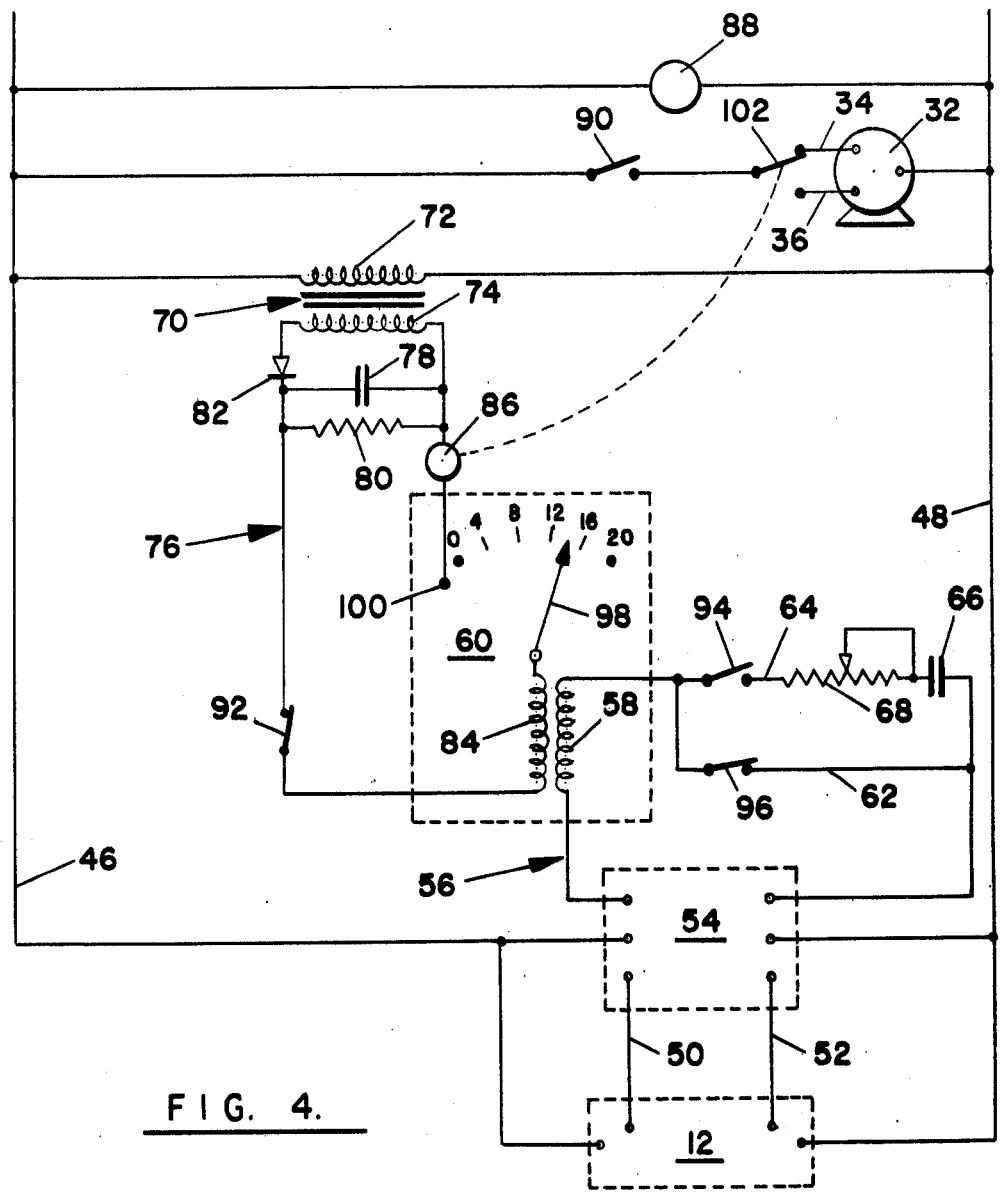
FIG. 4 is a schematic representation of a second embodiment of apparatus manifesting aspects of the invention.

In FIG. 4 there is illustrated schematically another embodiment of apparatus for practicing the invention in which the gas analyzer is again indicated 12. Analyzer 12 receives current from line voltage rails 46, 48 and provides a signal via lines 50, 52 to a linear amplifier 54 also powered from line voltage rails 46, 48. Output of amplifier 54 is provided to a loop circuit designated generally 56 and including an input coil 58 of a locking coil-meter-relay designated generally 60. Loop circuit 56 further includes two parallel branches 62, 64 where branch 64 includes a capacitor 66 in series with a variable resistor 68. Branch 62 serves to short circuit branch 64, as desired.

A transformer designated generally 70 receives voltage from rails 46, 48 across a primary winding 72. The secondary winding 74 of transformer 70 forms a part of a second loop circuit designated generally 76. Circuit 76 includes a capacitor 78 and a resistor 80 in parallel with one another with this R-C combination being in parallel with secondary winding 74 and separated therefrom by a diode 82. Second loop circuit 76 further includes output coil 84 of locking coil-meter-relay 60 and a direct current reversing impulse relay 84. The output coil of relay 84 is connected to contact either of respective input terminals 34, 36 of motor 32. A cycle timer designated generally 88 receives power from voltage rails 46, 48 and includes four cycle timer contacts 90, 92, 94, 96. Each of the four contacts 90, 92, 94, 96 is adjustable with respect to the time at which the contact will be opened or closed by timer 88.

Cycle timer contact 90 is normally open and when closed energizes motor 32. Cycle timer contact 92 is normally closed and when opened resets meter relay 60. Cycle timer contact 94 is normally open and closes to permit current flow from the R-C combination 66, 68 to connect this combination with input coil 58. Contact 96 is normally closed to permit the output signal from amplifier 54 to be read on the meter portion of relay 60.

Figure 5:
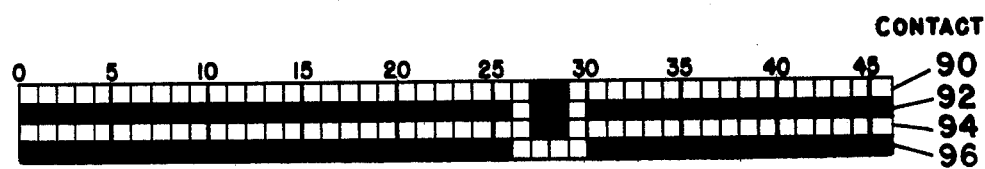
FIG. 5 is a bar chart illustrating the sequence of operation of apparatus depicted in FIG. 4.

FIG. 5 illustrates one sequence of operation of the apparatus of FIG. 4 as controlled by cycle timer 88. The sequence illustrated works on a thirty second cycle.

During operation, gas analyzer 12 continually samples the carbon dioxide product of combustion in the exhaust gas from furnace 2 and provides a signal indicative of the carbon dioxide level in the furnace combustion gas to amplifier 54. Amplifier 54 amplifies the signal and provides it as a continuous input to first loop circuit 56. During the period when contact 94 is open and contact 96 is closed, the signal output by amplifier 54 energizes a meter portion of relay 60 by passing through input coil 58. The meter portion of relay 60 provides a direct reading of percent carbon dioxide in the exhaust gas for an operator during a portion of the control cycle.

From FIG. 5, at initial time which corresponds to time zero seconds, contacts 92, 96 close while contacts 90, 94 remain open. This causes the signal output from amplifier 54 to bypass R-C combination 66, 68 with passage of this signal through coil 58 actuating the meter portion of relay 60 thereby providing the operator with a visible signal indicative of the percent carbon dioxide sensed in the furnace exhaust gas. Closure of contact 92 provides power to relay 60 for display of a meter reading corresponding to the signal produced by amplifier 54. Contacts 90, 94, being open, isolate motor 32 and R-C combination 66, 68, preventing current flow therethrough. At time twenty-six seconds, contacts 92, 96 open. Opening contact 92 halts current flow around second loop circuit 76 thereby permitting indicating needle 98 of relay 60 to go to zero. Action of contact 92 opening, thereby halting flow of current around second loop circuit 76, prevents needle 98 of relay 60 from contacting terminal 100, thereby completing second loop circuit 76 and actuating reversing impulse relay 86.

At time twenty-seven seconds, contacts 90, 92, 94 close while contact 96 remains open. Closure of contact 94 couples capacitor 66 into first loop circuit 56 and hence into series connection with coil 58. Capacitor 66 is charged with the voltage produced by amplifier 54 during the previous operating cycle. Upon closure of contact 94, if the voltage from the previous cycle is lower than the voltage currently output by amplifier 54, current temporarily flows clockwise about first loop circuit 56 in FIG. 4, bringing the charge on capacitor 66 up to the current voltage output by amplifier 54. Such charging of capacitor 66 denotes that the present level of carbon dioxide sensed in the furnace exhaust gas is higher than the immediately preceedingly sensed value. This current flow around first loop circuit 56 through coil 58 acts to move needle 98 slightly above zero as capacitor 66 is being charged. Resultant clockwise current flow around first loop circuit 56 prevents needle 98 from contacting terminal 100 and, accordingly, reversing impulse relay 86 is not energized and motor 32, when actuated, continues to rotate in the same direction as previously.

If upon closure of contact 94 the voltage output by amplifier 54 is less than the charge then exisiting on capacitor 66, current travels counterclockwise around first loop circuit 56. Such current flow through input coil 58 causes needle 98 of relay 60 to drop below zero, contacting terminal 100. Needle 98-terminal 100 contact completes second loop circuit 76, actuating reversing impulse relay 86, causing the output switch 102 to reverse, breaking contact with termianl 34 or 36 and making contact with the remaining terminal of the pair 34, 36.

Actuation of relay 86 thus causes the direction of rotation of motor 32 to reverse.

Since contact 90 closes simultaneously with contacts 92, 94 at twenty-seven seconds, motor 32 is actuated for the two second duration closure of contact 90. Thus motor 32 operates for two seconds, to further open or further close damper valve 8, according to whether the signal presently received from gas analyzer 12 is less than or greater than the immediately preceedingly received signal. At time twenty-nine seconds, all four cycle timer 88 contacts 90, 92, 94, 96 open for one second whereupon the cycle repeats.

Gas analyzer 12 can be either a carbon dioxide analyzer or a specific gravity meter. A specific gravity meter can fulfill the function since the carbon dioxide component is the heaviest substantial component in furnace combustion gas. Accordingly, a carbon dioxide analyzer and a specific gravity meter will sense the same peaks indicative of carbon dioxide presence in the combustion gas. Output signal from the carbon dioxide analyzer or the specific gravity meter, whichever is used, should preferably be either in the standard 4–20 milliamp range or in the 10–50 milliamp range.

Module 18 in FIG. 2 may be a type 20-419A sample-and-hold module available from Devar, Inc., Bridgeport, Connecticut. Comparator 24 in FIG. 2 may be type 19-501 comparator function module also available from Devar, Inc.

Utilizing the invention, no carbon dioxide or oxygen set point is required since the invention seeks the peak carbon dioxide and continually oscillates about this peak to provide maximum burner efficiency. Operator attention or adjustment is not required once cycle time has been established.

The invention can be retro-fitted to almost any combustion process where flow rate of combustion air can be controlled. The invention operates independently of the basic combustion process control system in nearly all cases.

Air infiltration through furnace leakage does not affect operation of the invention. This is a major advantage of the invention over conventional systems using a set point for desired oxygen content. In a system measuring oxygen content against a desired oxygen content set point, if air infiltration becomes significant, combustion air may be closed off, compensating for air leaking in and causing the burners to burn fuel-rich or inefficiently. This is because an oxygen analyzer cannot distinguish leakage oxygen from combustion air oxygen. The present invention avoids that deficiency.

Successful operation of the invention is not dependent on knowledge of excess air required for maximum efficiency of a given burner. Maximum carbon dioxide percentage for a burner is determined by the excess air required by that burner. As the maximum carbon dioxide level is located automatically by the invention, the invention sends the proper amount of excess air to the burner.

Furthermore, successful operation of the invention is not dependent on avoiding fuel or load changes. With conventional systems, fuel or load changes require changes in air supplied to the burner. Air supplied is conventionally changed by resetting the fuel-air ratio to compensate for a fuel which requires a changed amount of air per unit volume of fuel over that required by a previously used fuel. With the present invention, flow rate of combustion air is always very close to the optimum rate even as fuel and/or load changes.

What is claimed is:

1. Apparatus for regulating flow of combustion air to a furnace thereby to maintain a relatively optimum fuel-air mixture for high combustion efficiency in response to a measured level of carbon dioxide in furnace gas after combustion thereof, comprising:
   a. gas analyzer for sensing relative level of carbon dioxide in furnace gas after combustion thereof and producing an electrical signal proportional to sensed carbon dioxide level;
   b. amplifier means, receiving said electrical signal from said gas analyzer, for boosting said signal to a second signal level;
   c. a first loop circuit having said second signal applied to respective terminals thereof, said first loop circuit including:
      i. an inductor defining an input coil of a relay;
      ii. a capacitor;
      iii. variable resistance means in series connection with said capacitor for tuning the resultant resistor-capacitor combination;
      iv. first switching means, in series with said capacitor-variable resistor combination, for open circuiting said resistor-capacitor combination with respect to said inductor; and
      v. second switching means, in parallel with said first switching means-resistor-capacitor combination, for short circuiting said first switching means-resistor-capacitor combination;
   d. said relay having its output connected in series with a second loop circuit;
   e. said second loop circuit including;
      i. a meter for visibly indicating current flow around said circuit;
      ii. an input coil to a second relay;
      iii. an output winding of a transformer;

iv. rectifier means for rectifying said transformer output; and
v. third switching means for opening said second loop circuit;
f. said transformer having its input winding connected to line voltage;
g. second relay output being movable between respective input terminals of an electric motor for selective connection thereof with line voltage;
h. said electric motor having an output shaft rotating in respective opposite directions according to which of said respective input terminals is contacted by said second relay output;
i. a damper, controlling flow of combustion air to said furnace, connected to said electric motor output shaft, opening further and closing further upon rotation of said motor shaft in respective opposite directions;
j. fourth switching means for open circuiting said electric motor; and
k. a timer operatively connected to said fourth switching means, for sequentially
  i. opening said second and fourth switching means while maintaining said first and third switching means closed;
  ii. opening said first and third switching means while maintaining said second and fourth switching means closed;
  iii. closing said second, third and fourth switching means while maintaining said first switching means open;
  iv. opening said second, third and fourth switching means while maintaining said first switching means closed; and
  v. closing said first and third switching means while maintaining said second and fourth switching means open.

2. Apparatus for regulating flow of combustion air to a furnace thereby to maintain a relatively optimum fuel-air mixture for high combustion efficiency in response to a measured level of carbon dioxide in furnace gas after combustion, comprising:
a. a gas analyzer for continuously sensing relative level of carbon dioxide in furnace gas after combustion and continuously producing an electrical signal proportional to sensed carbon dioxide level;
b. a sample-and-hold module, receiving said electrical signal from said gas analyzer, for producing a continuous signal corresponding to said electrical signal produced by said gas analyzer at a preselected time;
c. a voltage comparator, receiving input from said sample-and-hold module, for comparing output of said sample-and-hold module to said electrical signal output by said gas analyzer after said preselected time and for producing an output signal only if said electrical signal output by said gas analyzer after said preselected time is of lower magnitude than output of said sample-and-hold module;
d. a reversing impulse relay receiving as input any signal output by said voltage comparator;
e. an electric motor having an output shaft rotating in respective opposite directions according to which of respective motor input terminals is contacted by said reversing impulse relay, said motor input terminals being connected to said reversing impulse relay output terminals; and
f. timer means for periodically concurrently actuating said motor and said sample-and-hold module, and for thereafter actuating said voltage comparator thereby to compare said signal output by said gas analyzer with said signal produced by said sample-and-hold module;
wherein said motor output shaft is connected to a damper regulating flow of combustion air into said furnace, motor output shaft rotation respectively opening or closing said damper, thereby increasing or decreasing flow of combustion air into said furnace, according to the direction of motor output shaft rotation.

* * * * *